US006100741A

United States Patent [19]

Ogawa et al.

[11] Patent Number: 6,100,741

[45] Date of Patent: Aug. 8, 2000

[54] SEMICONDUCTOR INTEGRATED CIRCUIT UTILIZING INSULATED GATE TYPE TRANSISTORS

[75] Inventors: Katsuhisa Ogawa, Machida; Tadahiro Ohmi, Sendai; Tadashi Shibata, Tokyo, all of Japan

[73] Assignee: Canon Kabushiki Kaisha, Tokyo, Japan

[21] Appl. No.: 09/110,012

[22] Filed: Jul. 2, 1998

[30] Foreign Application Priority Data

Jul. 2, 1997 [JP] Japan .................................... 9-176866

[51] Int. Cl.[7] ................................ G06F 7/44; G06G 7/16

[52] U.S. Cl. ............................................................. 327/356

[58] Field of Search ..................................... 327/355, 356, 327/538, 543; 323/315

[56] References Cited

U.S. PATENT DOCUMENTS

| | | | |
|---|---|---|---|
| 5,391,947 | 2/1995 | Groves, Jr. et al. | 327/346 |
| 5,541,444 | 7/1996 | Ohmi et al. | 257/587 |
| 5,600,270 | 2/1997 | Shou et al. | 327/75 |
| 5,835,045 | 11/1998 | Ogawa et al. | 341/155 |
| 5,939,925 | 8/1999 | Shibata et al. | 327/355 |

OTHER PUBLICATIONS

B. Gilbert, "A Precise Four–Quadrant Multiplier with Subnano Second Response", IEEE J. Solid–State Circuits, Dec. 1993, vol. SC–3, pp. 365–373.

J. Babanezhad, et al., "A 20–V Four Quadrant CMOS Analog Multiplier", Dec. 1985, IEEE Solid–State Circuits, vol. SC–20, pp. 1158–1168.

H. J. Song, et al., "An MOS Four–Quadrant Analog Multiplier Using Simple Two–Input Squaring Circuits with Source Followers," Jun. 1990, IEEE J. Solid–State Circuit, vol. 25 pp. 841–847.

A. Andreou, et al, "Current Mode Subthreshold MOS Ciruits for Analog VLSI Neural Systems," Mar. 1991, IEEE Trans. Neural Networks, vol. 2, No. 2, pp. 205–213.

*Primary Examiner*—Terry D. Cunningham
*Assistant Examiner*—Quan Tra
*Attorney, Agent, or Firm*—Fitzpatrick, Cella, Harper & Scinto

[57] ABSTRACT

For raising the accuracy of analog multiplication, a gate-drain (G-D) connection point of transistor (Tr) whose gate-drain (G-D) are shorted and whose source is connected to ground potential is connected to a source of second Tr whose G-D are shorted, a first input signal current source is connected to a G-D connection point of the second Tr, a G-D connection point of third Tr whose G-D are shorted and whose source is connected to the ground potential is connected to a source of fourth Tr whose G-D are shorted, a second input signal current source is connected to a G-D connection point of the fourth Tr, the G-D connection points of the second and fourth Tr's are connected to first and second capacitors respectively, outputs of the first and second capacitors are connected to each other and to a gate of fifth Tr to form a floating point, a source of the fifth Tr is connected to the ground potential, and a drain current of the fifth Tr is an operation output.

7 Claims, 2 Drawing Sheets

SEMICONDUCTOR INTEGRATED CIRCUIT UTILIZING INSULATED GATE TYPE TRANSISTORS

BACKGROUND OF THE INVENTION

1. Field of the Invention

The present invention relates to a semiconductor integrated circuit and, more particularly, to a semiconductor integrated circuit suitably applicable to analog multipliers.

2. Related Background Art

Among analog signal processes, highly accurate analog multiplication technology has been developed by many researchers. Particularly, the four-quadrant multiplier presented in the paper of "B. Gilbert, "A precision four-quadrant multiplier with subnanosecond response," IEEE J. Solid-State Circuits vol. SC-3, pp 365–373, December 1963" comes so far as the original model of multipliers of semiconductor integrated circuits, called Gilbert's multiplier. Since then, many analog multipliers have been suggested and developed, including "J. N. Babanezhad and G. C. Temes, "A 20-V four-quadrant CMOS analog multiplier, "IEEE J. Solid-State Circuits, vol. SC-20, pp 1158–1168, December 1985," "H. J. Song and C. K. Kim, "An MOS four-quadrant analog multiplier using simple two-input squaring circuits with source followers,"IEEE J. Solid-State Circuit, vol. 25, pp 841–847, June 1990," and so on. These circuits are characterized by use of bipolar transistors or MOS transistors. Among them, operating points of the MOS transistors were based on the operation in the mode where an inversion layer was formed in the channel with application of a voltage not less than Vth, i.e., the operation in the triode region and the saturation region of MOS transistor.

The core of operation of present signal processing utilizes many product-sum operations as in digital signal processing. When these processes were attempted to be replaced by parallel analog processes, many multipliers were necessitated and it was difficult in terms of electric power consumption to realize a circuit configuration composed of the MOS transistors that operate in the above-stated triode region and saturation region. A circuit, overcoming this problem, is a multiplier using the operation in the subthreshold region of MOS transistor as described in "A. G. Andreou, K. A. Boahen, P. O. Pouliquen, A. Pavasovic, R. E. Jenkins and K. Strohben, "Current-mode subthreshold MOS circuit for analog VLSI neural systems," IEEE Trans. Neural Networks, vol. 2, no 2, pp 205-pp 213" or "C. A. Mead, Analog VLSI and Neural Systems, Reading, MA: Addison-Wesley, 1989." FIG. 1 illustrates an example of a circuit diagram of a multiplier using the MOS transistors in the subthreshold region. The operation region of the MOS transistors in FIG. 1 is a weak inversion layer state where the gate-source voltage Vgs is far lower than the threshold voltage Vth and where a complete inversion layer is not formed in the channel, which is the subthreshold region in which the drain current Id is determined exponentially against values of the gate-source voltage Vgs. In FIG. 1, numeral 1 designates a first input current signal source having a value of Ix and 2 a second input signal source having a value of Iy. One terminal of the first signal current source 1 is connected to power-supply voltage 4 and a current output terminal being the other terminal thereof is connected to a common connection point A between a drain terminal of MOS transistor 52 and a gate terminal of MOS transistor 53 to supply a drain current Id52 of the MOS transistor 52. A source terminal of the MOS transistor 52 is connected to the ground potential 5 and a gate terminal thereof is connected to a source terminal of the MOS transistor 53 and to a drain terminal of MOS transistor 51. The source of the MOS transistor 51 is connected to the ground potential 5 and the gate terminal thereof is connected to a common connection point between the drain and the gate of MOS transistor 50 and to a current output terminal of the second input signal current source 2. The other terminal of the second input signal current source 2 is connected to the power-supply voltage 4. The MOS, transistor 50 and MOS transistor 51 compose a current mirror circuit to mirror an input of the current of the second input signal current source 2 and output the drain current Id51 of the MOS transistor 51. A third input signal current source 58 has the value of Iz, one terminal of the third input signal current source 58 being connected to the power-supply voltage 4 and the other terminal thereof supplying a current output to be injected to a common connection point between the gate and source terminals of MOS transistor 57 and the gate terminal of MOS transistor 56. The MOS transistor 57 and MOS transistor 56 compose a current mirror circuit to mirror Iz of the third input signal current source 58 and output the drain current Id56 of the MOS transistor 56. The drain terminal of the MOS transistor 56 is connected to a common connection point between the source terminal of MOS transistor 54 and the gate terminal of MOS transistor 55. The gate terminal of the MOS transistor 54 is connected to a common connection point A among the gate terminal of MOS transistor 53, the drain terminal of MOS transistor 52, and the current output terminal of the first input signal current source 1. The source terminal of MOS transistor 55 is connected to the ground potential 5 and an output current is taken out of the drain terminal thereof. Since the all MOS transistors operate in the subthreshold region, the drain current Id is determined exponentially against the gate-source voltage Vgs. Namely, the following relation holds: Id =I0·exp(Vgs/V0) or Vgs =V0·ln(Id/I0) (where I0, V0 are constants determined from device characteristics). The gate-source voltages of the MOS transistors 52, 50 receiving the first and second input signal currents Ix, Iy are given as follows: Vgs52=V0·ln(Ix/I0), Vgs50 32 V0·ln(Iy/I0). Since the MOS transistor 50 and MOS transistor 51 compose the current mirror, the drain current Id51 of the MOS transistor 51 is equal to Iy and thus the following relation holds: Id51=Iy. The drain current of the MOS transistor 53 is also equal to it, and thus the following relation holds: Iy=Id51=Id53. Therefore, the gate-source voltage of the MOS transistor 53 is given by Vgs53=V0·ln(Iy/I0).

The potential Va at the common connection point A is given as follows: Va=Vgs52+Vgs53=V0·ln(Ix/I0) +V0·ln (Iy/I0), which is an addition of logarithmic functions, and the potential Va=V0·ln(Ix·Iy/I0$^{2}$) finally, thus obtaining the term of the product of input signals Ix, Iy. Since the third input signal current Iz is equal to the drain current Id56 of the MOS transistor 56 because of the current mirror circuit, the gate-source voltage Vgs54 of the MOS transistor 54 becomes Vgs54=V0·ln(Iz/I0). When the drain current of the MOS transistor 55 as an output current is Iout, Vgs55=V0·ln (Iout/I0). Therefore, the potential Va at the common connection point A is given as follows: Va=Vgs54+Vgs55 V0·ln(Iz/I0)+V0·ln(Iout/I0)=V0·ln(Iz-Iout/I0$^{2}$), which is the form of the product of Iz and Iout. Namely, the following relation holds: Va=V0·ln(Ix=19 Iy/I0$^{2}$)=V0·ln(Iz·Iout/I0$^{2}$). Accordingly, the relation among the four currents is given by Ix·Iy=Iz-Iout. Therefore, the output current taken out of the drain terminal of the MOS transistor 55 at last is Iout=(Ix·Iy)/Iz, which is a current obtained by dividing the product of the input signal currents Ix, Iy by the input signal current Iz. Assuming Iz is a unit current 1, Iout =Ix·Iy, so that the product of the two input-signal currents emerges as an output current.

For realizing the above-stated circuit, however, there were some points to be improved. When attention is focused on the first and second input signal currents Ix, Iy in the first voltage adder composed of the MOS transistor 52 and MOS transistor 53 to create the potential $Va=V0 \cdot \ln(Ix \cdot Iy/I0^2)$ at the common connection point, the circuit is configured in such a form that the current Ix flows into the circuit while the current Iy flows out of the circuit. In this configuration, the direction of original input signal current Iy is turned by the current mirror composed of the MOS transistor 50 and MOS transistor 51 and the mirrored current Id51=Iy is pulled through the source terminal of the MOS transistor 53. This causes an error due to the current mirror of one stage to be superimposed on Iy and the current Iy with the error is applied to the first voltage adder. This drops the accuracy of Iy input. Since the drain voltage of the MOS transistor 52 for delivering Iy is clamped at the value of Vgs52 of the MOS transistor 52, the drain-source voltage Vds51 of the MOS transistor 51 is controlled to a very low voltage.

[$Vds51=Vgs52=V0 \cdot \ln(Ix/I0)$]

Namely, the current value Iy set by the current mirror is not allowed to flow because of the low drain voltage, and thus Id51 becomes smaller than Iy. This sometimes degraded the accuracy of analog multiplication considerably. In addition, the circuit of FIG. 1 required the additional circuit for letting the unit current Iz flow, which increased the circuit scale.

SUMMARY OF THE INVENTION

The present invention has been accomplished in view of the above points, and an object of the present invention is to provide a semiconductor integrated circuit that can perform the operation with accuracy by use of the smaller number of transistors.

Another object of the present invention is to provide a semiconductor integrated circuit of a small circuit scale and low power consumption.

A further object of the present invention is to provide a semiconductor integrated circuit that can perform high-speed operation suitable for parallel processing.

A further object of the present invention is to provide a semiconductor integrated circuit comprising insulated gate type transistors which operate in a subthreshold region where a gate-source voltage is lower than a threshold and where a drain current is expressed by an exponential function of the gate-source voltage, wherein a gate-drain connection point of a first insulated gate type transistor whose gate and drain are shorted and whose source is connected to a lower-voltage-side power-supply potential or a higher-voltage-side power-supply potential is connected to a source of a second insulated gate type transistor whose gate and drain are shorted, and first input signal current means is connected to a gate-drain connection point of the second insulated gate type transistor, wherein a gate-drain connection point of a third insulated gate type transistor whose gate and drain are shorted and whose source is connected to the lower-voltage-side power-supply potential or the higher-voltage-side power-supply potential is connected to a source of a fourth insulated gate type transistor whose gate and drain are shorted, and second input signal current means is connected to a gate-drain connection point of the fourth insulated gate type transistor, wherein the gate-drain connection points of said second and fourth insulated gate type transistors are connected to first and second capacitor means, respectively, outputs of said first and second capacitor means are connected to each other and to a gate of a fifth insulated gate type transistor to form a floating point, and a source of the fifth insulated gate type transistor is connected to the lower-voltage-side power-supply potential or the higher-voltage-side power-supply potential, and wherein a drain current of said fifth insulated gate type transistor is an operation output.

According to the present invention, two input currents undergoing current-voltage conversion by subthreshold characteristics are logarithmically compressed to respective voltages, and a weighted average thereof is taken at the floating point by the capacitor means, thus generating a voltage having a term of a product of the two input currents. This voltage experiences exponential conversion in the insulated gate type transistor having the subthreshold characteristics to obtain a linear product of the two currents. Since the input configuration of the circuit is of complete symmetry and addition of voltages employed is the highly accurate adding method by capacitive coupling, the highly accurate analog current product can be calculated by only five transistors. Because of the operation in the subthreshold region, the operation can be performed with small power consumption; and, even with many semiconductor circuits of the present invention being used, an analog parallel multiplying unit and an analog arithmetic unit can be configured in a small chip area and with low power consumption.

DETAILED DESCRIPTION OF THE PREFERRED EMBODIMENTS

The embodiments of the present invention will be described in detail by reference to the drawings. The embodiments described below are examples using typical MOS transistors as insulated gate type transistors.

First Embodiment

Figure 1:
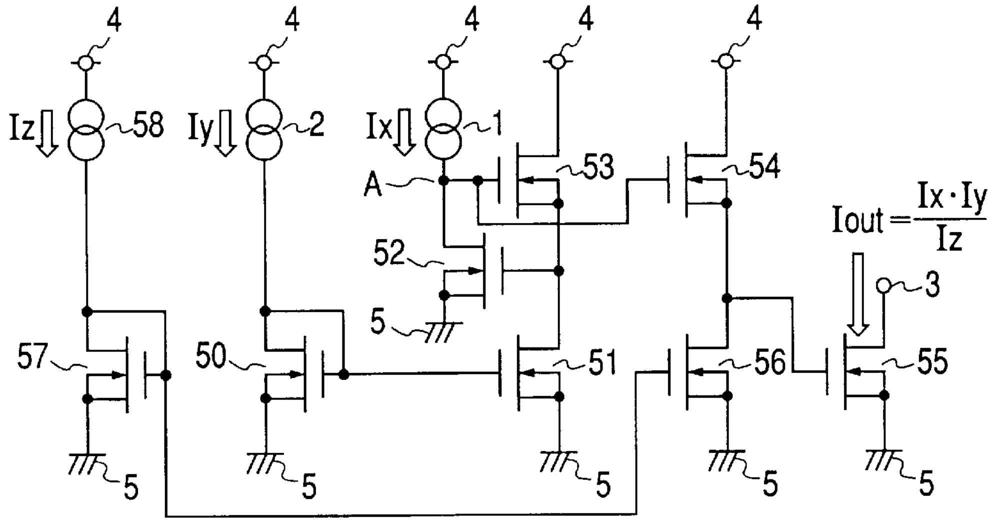
FIG. 1 is a schematic circuit diagram for explaining an example of the current mode multiplier.
Figure 2:
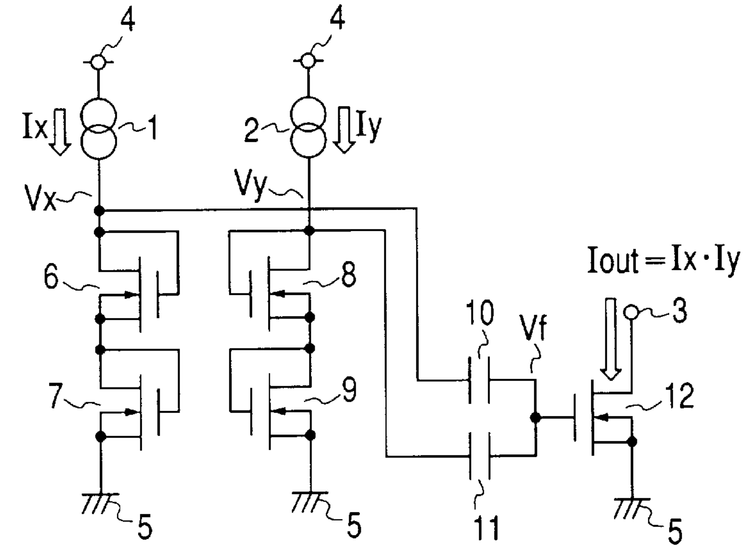
FIG. 2 is a schematic circuit diagram for a explaining a preferred example of the semiconductor integrated circuit according to the present invention.

FIG. 2 is a circuit diagram to show the first embodiment of the present invention. In FIG. 2, input signals of the circuit are a current of a first input signal current source 1 whose current value is Ix and a current of a second input signal current source 2 whose current value is Iy. Numeral 4 designates a power-supply potential (which is a power-supply potential on the higher voltage side). The first input signal current source 1 is connected to a drain-gate common connection point (voltage Vx) of NMOS transistor 6 having the shorted drain and gate, and the source of the NMOS transistor 6 is connected to a drain-gate common connection point of NMOS transistor 7 also having shorted drain and gate. The source of the NMOS transistor 7 is connected to the ground potential 5 (which is a power-supply potential on the lower voltage side). The second input signal current source 2 is connected to a drain-gate common connection point (voltage Vy) of NMOS transistor 8 having the shorted drain and gate, and the source of the NMOS transistor 8 is connected to a drain-gate common connection point of NMOS transistor 9 also having the shorted drain and gate. The source of the NMOS transistor 9 is connected to the ground potential 5. The operation region of the NMOS transistors in the present invention is the weak inversion layer state where the gate-source voltage Vgs is far lower than the threshold voltage Vth and where a complete inversion layer is not formed in the channel, which is the subthreshold region where the drain current Id is determined exponentially against values of Vgs. Ratios WIL (W: channel width, L: channel length) of the respective NMOS transistors 6, 7, 8, 9, 12 are preferably all equal (including the case where they are regarded as substantially equal). The point is that values of W/L of the respective NMOS transistors are equal, but values of W and L do not always have to be equal, though desirably being equal.

Since the all NMOS transistors operate in the subthreshold region, the drain current Id is determined exponentially against the gate-source voltage Vgs. Namely, Id=I0·exp (Vgs/V0) or Vgs=V0·ln(Id/I0). The voltage Vx at the drain-gate common connection point of the NMOS transistor 6 receiving the current flowing thereinto from the first input signal current source 1 is a value obtained by logarithmic conversion of the inflow current Ix. Since the inflow current Ix flows through the drain-gate-short NMOS transistor 6 and NMOS transistor 7 connected in series, Vx is the sum of the gate-source voltage Vgs6 of the NMOS transistor 6 and the gate-source voltage Vgs7 of the NMOS transistor 7. Namely, the following relation holds: Vx=Vgs6 +Vgs7. Vgs6 and Vgs7 are voltages achieved by logarithmic conversion of the inflow current Ix.

Accordingly, the following relation holds: Vx =V0·ln(Ix/I0)+V0·ln(Ix/I0)=2V0·ln(Ix/I0). The voltage Vy at the drain-gate common connection point of the NMOS transistor 8 receiving the current flowing thereinto from the second input signal current source 2 is a value obtained by logarithmic conversion of the inflow current Iy. Since the inflow current Iy flows through the drain-gate-short NMOS transistor 8 and NMOS transistor 9 connected in series, Vy is the sum of the gate-source voltage Vgs8 of the NMOS transistor 8 and the gate-source voltage Vgs9 of the NMOS transistor 9. Namely, the following relation holds: Vy=Vgs8+Vgs9. Vgs8 and Vgs9 are voltages achieved by logarithmic conversion of the inflow current Iy. Accordingly, the following relation holds: Vy=V0·ln(Iy/I0)+V0·ln(Iy/I0)=2V0·ln(Iy/I0). In this way the signal currents Ix, Iy of the first and second input signal current sources 1, 2 undergo the logarithmic conversion by the subthreshold-operating NMOS transistors, thus being converted to the voltages Vx, Vy. The drain-gate common connection point of the NMOS transistor 6 with the voltage Vx appearing thereat is connected through a first capacitor 10 having the capacitance of Cx to a floating point Vf, and the drain-gate common connection point of the NMOS transistor 8 with the voltage Vy appearing thereat is connected through a second capacitor 11 having the capacitance of Cy to the floating point Vf. Connected to the floating point Vf is the gate of NMOS transistor 12, the source of which is connected to the ground potential 5 and the drain of which outputs the output current Iout. The potential at the floating point Vf is settled at a voltage value resulting from calculation of a weighted average of the voltages Vx, Vy capacitively coupled with the capacitances Cx, Cy of the first and second capacitors 10, 11. Equaling the capacitances Cx, Cy, Vf (Cx·Vx +Cy·Vy)/(Cx+Cy) (Vx+Vy)/2.

Accordingly, Vf={2·V0·ln(Ix/I0)+2·V0·ln(Iy/I0)}/2=V0·ln(Ix/I0)+V0·ln(Iy/I0)=V0·ln(Ix·Iy/$\mathbf{I0}^2$), thus generating the product Ix·Iy of the input currents. Vf is the gate-source voltage Vgs12 of the NMOS transistor 12, and with the drain current Iout, Vgs12=V0·ln(Iout/I0). Since Vf=Vgs12, the following relation holds: V0·ln(Ix·Iy/$\mathbf{I0}^2$)=V0·ln(Iout/I0). Letting I0 be a unit current, the drain current of the NMOS transistor 12 is given by Iout=Ix·Iy and is thus taken out in the form of the linear product Ix·Iy of the input currents. In the present embodiment, the input methods of the first and second input signal current sources 1, 2 to the circuit are of complete symmetry, and the drain-source voltages of the MOS transistors forming the first and second input signal current sources 1, 2 are high enough, which prevents occurrence of an error due to asymmetry of input current methods and which permits the highly accurate current mode analog multiplier to be configured of only five transistors. Since the operation is carried out in the subthreshold region, the operation can be performed with less power consumption; and, even in the case where many circuits of the present invention are used, an analog parallel multiplying unit can be realized in a small chip area and with small power consumption.

The first and second capacitors 10, 11 and NMOS transistor 12 shown in FIG. 2 can be constructed of a multiple-input MOS transistor having a floating gate electrode. This multiple-input MOS transistor can be achieved by a two-layer polysilicon CMOS process or the like.

Figure 3:
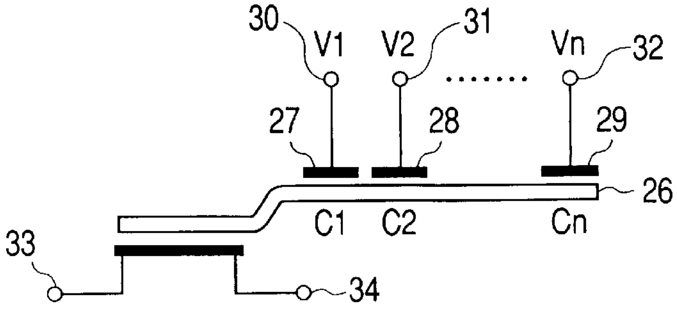
FIG. 3 is a schematic diagram for explaining an example of a multiple-input MOS transistor having a floating gate electrode.

FIG. 3 is a conceptual drawing of the multi-input MOS transistor having the floating gate electrode.

A first gate insulating film is formed on a channel between the source (main electrode) 33 and the drain (main electrode) 34 spaced from each other on a semiconductor substrate, and a floating gate electrode (control electrode) 26 of first polycrystal silicon is formed through the first gate insulating film thereon. N input gate electrodes 27, 28–29 of second polycrystal silicon are formed through a second gate oxide film on this floating gate electrode 26. The input gate electrodes 27, 28–29 are connected to respective input terminals 30, 31–32. In this way the multi-input device can be achieved with the capacitive couplings of C1, C2-Cn with the floating gate electrode 26.

When the N input gate electrodes 27, 28–29 capacitively coupled with the floating gate electrode 26 are formed in this way, the potential of the floating gate electrode 26 is given by a weighted average of input voltages applied to the multiple input gates, and the transistor is switched on or off by whether the weighted average surpasses the threshold of the transistor. Since the operation is similar to that of the neuron being a fundamental constituent unit of the brain of organism, this is called a neuron MOS transistor (hereinafter referred to as υMOS).

Figure 4:
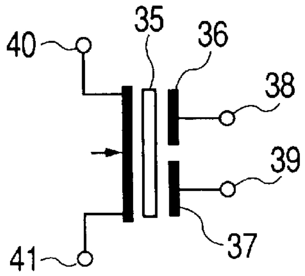
FIG. 4 is a schematic diagram of an MOS transistor having capacitive couplings of two inputs.

FIG. 4 is a conceptual drawing of VMOS having two-input capacitive couplings, which can be used in the present embodiment. The VMOS shown in FIG. 4 is constructed of drain 40 and source 41, floating gate electrode 35, input gate electrodes 36, 37, and input terminals 38, 39 connected to the input gate electrodes 36, 37. Now, let Cox be a capacitance established between the floating gate electrode 35 and the input gate electrode 36, Coy be a capacitance established between the floating gate electrode 35 and the input gate electrode 37, Vox be a voltage applied to the input terminal 38, and Voy be a voltage applied to the input terminal 39. Then the potential φF of the floating gate electrode 35 is expressed by the following equation.

$$\phi=(Cox\cdot Vox+Coy\cdot Voy)/(Cox+Coy)$$

As apparent from this equation, the potential φF of the floating gate electrode 35 is the weighted average, and this weighted average is determined by a ratio of the capacitive couplings.

Second Embodiment

Figure 5:
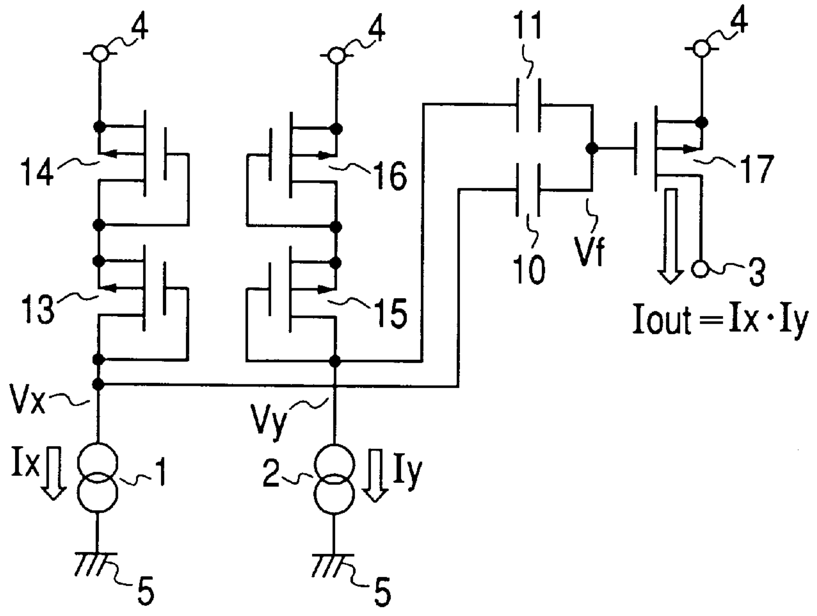
FIG. 5 is a schematic circuit diagram for explaining another preferred example of the semiconductor integrated circuit according to the present invention.

FIG. 5 is a circuit diagram to show the second embodiment of the present invention. In FIG. 5, numerals 1 to 5, 10, and 11 are the same as those shown in FIG. 2 of the first embodiment. The present embodiment is basically an example in which the connection of the higher voltage side and the lower voltage side in the first embodiment is changed to the forward sequence. Input signals of the circuit are the currents of the first input signal current source 1 whose current value is Ix and the second input signal current source 2 whose current value is Iy. The first input signal current source I is connected to a drain-gate common connection point (voltage Vx) of PMOS transistor 13 having the shorted drain and gate, and the source of the PMOS transistor 13 is connected to a drain-gate common connection point of PMOS transistor 14 also having the shorted drain and gate. The source of the PMOS transistor 14 is connected to the power-supply voltage 4 (which is a power-supply voltage on the higher voltage side). The second input signal current source 2 is connected to a drain-gate common connection point (voltage Vy) of PMOS transistor 15 having the shorted drain and gate, and the source of the PMOS transistor 15 is connected to a drain-gate common connection point of PMOS transistor 16 also having the shorted drain and gate. The source of the PMOS transistor 16 is connected to the power-supply voltage 4. The operation region of the PMOS transistors in the present embodiments is the weak inversion layer state where the gate-source voltage Vgs is far lower than the threshold voltage Vth and where a complete inversion layer is not formed in the channel, which is the subthreshold region where the drain current Id is determined exponentially against values of Vgs. Ratios W/L (W: channel width, L: channel length) of the respective PMOS transistors 13, 14, 15, 16, 17 are preferably all equal (including the case where they are regarded as substantially equal). The point is that values of W/L of the respective PMOS transistors are equal, but values of W and L do not always have to be equal, though desirably being equal.

Since the all PMOS transistors operate in the subthreshold region, the drain current Id is determined exponentially against the gate-source voltage Vgs. Namely, Id=I0·exp (Vgs/V0) or Vgs=V0·ln(Id/I0). The voltage Vx at the drain-gate common connection point of the PMOS transistor 13 receiving the current flowing thereinto from the first input signal current source 1 is a value obtained by logarithmic conversion of the inflow current Ix. Since the inflow current Ix flows through the drain-gate-short PMOS transistor 13 and PMOS transistor 14 connected in series, a difference voltage between the power-supply voltage 4 and Vx is the sum of the gate-source voltage Vgs13 of the PMOS transistor 13 and the gate-source voltage Vgs14 of the PMOS transistor 14. Namely, the following relation holds: V4 (power supply voltage 4) −Vx=Vgs13+Vgs14. Vgs13 and Vgs14 are voltages achieved by logarithmic conversion of the inflow current Ix.

Accordingly, the following relation holds: Vx=V0·ln(Ix/I0)+V0·ln(Ix/I0)=2V0·ln(Ix/I0). The voltage Vy at the drain-gate common connection point of the PMOS transistor 15 receiving the current flowing thereinto from the second input signal current source 2 is a value obtained by logarithmic conversion of the inflow current Iy. Since the inflow current Iy flows through the drain-gate-short PMOS transistor 15 and PMOS transistor 16 connected in series, a difference voltage between the power-supply voltage 4 and Vy is the sum of the gate-source voltage Vgs15 of the PMOS transistor 15 and the gate-source voltage Vgs16 of the PMOS transistor 16. Namely, the following relation holds: V4 (power supply voltage 4)−Vy=Vgs15+Vgs16. Vgs15 and Vgs16 are voltages achieved by logarithmic conversion of the inflow current Iy.

Accordingly, the following relation holds: Vy=V0·ln(Iy/I0)+V0·ln(Iy/I0)=2V0·ln(Iy/I0). In this way the signal currents Ix, Iy of the first and second input signal current sources 1, 2 undergo the logarithmic conversion by the subthreshold-operating PMOS transistors, thus being converted to the voltages Vx, Vy. The drain-gate common connection point of the PMOS transistor 13 with the voltage Vx appearing thereat is connected through the first capacitor 10 having the capacitance of Cx to the floating point Vf, and the drain-gate common connection point of the PMOS transistor 15 with the voltage Vy appearing thereat is connected through the second capacitor 11 having the capacitance of Cy to the floating point Vf. Connected to the floating point Vf is the gate of PMOS transistor 17, the source of which is connected to the power-supply voltage 4 and the drain of which outputs the output current Iout. The difference potential Vgs17 between the floating point Vf and the power-supply voltage 4 is settled at a voltage value resulting from calculation of a weighted average of the voltages Vx, Vy capacitively coupled with the capacitances Cx, Cy of the first and second capacitors 10, 11. Equaling the capacitances Cx, Cy, Vgs17=(Cx·Vx+Cy·Vy)/(Cx+Cy) (Vx+Vy)/2.

Accordingly, Vgs17={2·V0·ln(Ix/I0)+2·V0·ln(Iy/I0)}/2= V0·ln(Ix/I0)+V0·ln(Iy/I0)=V0·ln(Ix·Iy/$\mathbf{I0}^2$), thus generating the product Ix·Iy of the input currents. With the drain current Iout of the PMOS transistor 17, Vgs17=V0·ln(Iout/I0). Since Vf=Vgs17, the following relation holds: V0·ln(Ix·Iy/$\mathbf{I0}^2$)=V0·ln(Iout/I0). Letting I0 be a unit current, the drain current of the PMOS transistor 17 is given by Iout=Ix·Iy and is thus taken out in the form of the linear product Ix·Iy of the input currents. In the present embodiment, the input methods of the first and second input signal current sources 1, 2 to the circuit are of complete symmetry, and the operating point can be set so as to achieve the sufficient drain-source voltages of the MOS transistors forming the first and second input signal current sources 1, 2, which prevents occurrence of an error due to asymmetry of input current methods and which permits the highly accurate current mode analog multiplier to be configured of only five transistors. Since the operation is carried out in the subthreshold region, the operation can be performed with less power consumption; and, even in the case where many circuits of the present invention are used, an analog parallel multiplying unit can be realized in a small chip area and with small power consumption.

Third Embodiment

Figure 6:
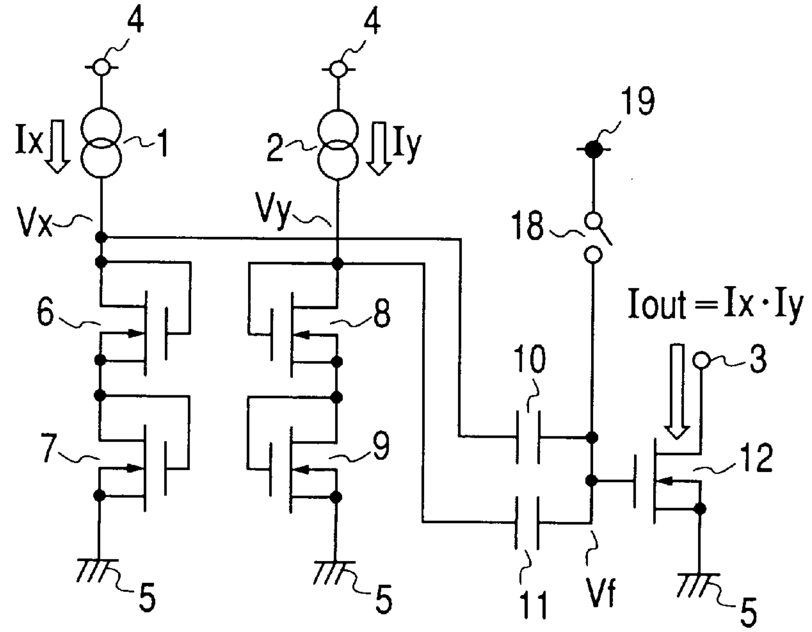
FIG. 6 is a schematic circuit diagram for explaining another preferred example of the semiconductor integrated circuit according to the present invention.

FIG. 6 is a circuit diagram to show the third embodiment of the present invention. In FIG. 6, numerals 1 to 12 are the same as the elements in the circuit of the first embodiment described above. The present embodiment is different from the first embodiment in that a reference voltage supply 19 is connected through a switch 18 to the floating point Vf. A reset mode is carried out before input of the first and second input signal current sources 1, 2 to establish a state of the currents Ix=Iy =0, and the reference supply 19 is set at the ground potential 5. When the switch 18 is then switched on, the potential Vf of the floating point becomes equal to the ground potential 5, thus initializing (or resetting) the charge at the floating point. Since the currents of the first and second input signal current sources 1, 2 are zero, Vx, Vy are also zero. Even if an offset appears in Vx, Vy because of a leak current upon the reset of the first and second input signal current sources 1, 2, the first and second capacitors 10, 11 are set to this value upon the reset of the floating point. Accordingly, the offset is canceled in the input of signals, so that a current mode analog multiplier can be realized with higher accuracy.

The reference supply 19 is set to a bias voltage Vbias at which the NMOS transistor 12 operates in the subthreshold region, different from the ground potential, and similarly, the currents of the first and second input signal current sources 1, 2 are set to be Ix=Ixbias, Iy=Iybias. When the switch 18 is switched on, the floating point becomes Vbias and the currents of the first and second input signal current sources 1, 2 become Ixbias, Iybias. At this time, the circuit is reset, and the first and second capacitors 10, 11 memorize the voltages at the both ends. Since this state can be set as zero input, the multiplication in the current mode is carried out after canceling the voltage offset contributing to Vth of MOS transistor and appearing at this time, and also canceling the error voltage contributing to the leak current, whereby the analog multiplier can be realized with higher accuracy without being affected by device variations.

According to the present invention, as detailed above, the two input currents undergoing the current-voltage conversion by the subthreshold characteristics are logarithmically compressed to the respective voltages and the weighted average thereof is taken at the floating point by the capacitors, thus generating the voltage having the term of the product of the two input currents. This voltage undergoes exponential conversion by the insulated gate type transistor having the subthreshold characteristics to obtain the linear product of the two currents. Since the circuit setup of the present invention has the input configuration of the complete symmetry type and the voltage addition is the high-accuracy addition method by capacitive coupling, the present invention permits the operation of highly accurate analog current product by use of the small number of transistors. Since the operation is carried out in the subthreshold region, the operation can be of low power consumption, and even with use of many semiconductor circuits of the present invention, analog parallel multiplying unit and analog arithmetic unit of low power consumption can be configured in a small chip area.

The Vth variation dependence is eliminated by the arrangement wherein the reset means is provided at the floating point of the current mode analog multiplier according to the present invention, wherein the constant voltage is delivered therefrom upon the reset, and wherein the input current values are set to zero or to the minimum input current value upon the reset whereby the first and second capacitors store the charge corresponding to the offset due to the Vth variation of the MOS devices; even in the case where a plurality of such semiconductor circuits of the present invention are integrated on a single chip, the current mode analog operational circuit can be realized with less errors between blocks. Therefore, the present invention permits massively parallel analog product-sum operation and thus can realize massively parallel operation such as visual image information processing in a small chip area, with low power consumption, and with high accuracy.

What is claimed is:

1. A semiconductor integrated circuit comprising insulated gate type transistors which operate in a subthreshold region where a gate-source voltage is lower than a threshold and where a drain current is expressed by an exponential function of the gate-source voltage, wherein a gate-drain connection point of a first insulated gate type transistor whose gate and drain are shorted and whose source is connected to a lower-voltage-side power-supply potential or a higher-voltage-side power-supply potential is connected to a source of a second insulated gate type transistor whose gate and drain are shorted, and first input signal current means is connected to a gate-drain connection point of the second insulated gate type transistor, wherein a gate-drain connection point of a third insulated gate type transistor whose gate and drain are shorted and whose source is connected to the lower-voltage-side power-supply potential or the higher-voltage-side power-supply potential is connected to a source of a fourth insulated gate type transistor whose gate and drain are shorted, and second input signal current means is connected to a gate-drain connection point of the fourth insulated gate type transistor, wherein the gate-drain connection points of said second and fourth insulated gate type transistors are connected to first and second capacitor means, respectively, outputs of said first and second capacitor means are connected to each other and to a gate of a fifth insulated gate type transistor to form a floating point, and a source of the fifth insulated gate type transistor is connected to the lower-voltage-side power-supply potential or the higher-voltage-side power-supply potential, and wherein a drain current of said fifth insulated gate type transistor is an operation output.

2. The semiconductor integrated circuit according to claim 1, wherein a current of said operation output is a product of a current of said first input signal current means and a current of said second input signal current means.

3. The semiconductor integrated circuit according to claim 1, wherein values of (channel width W)/(channel length L) of said first, second, third, fourth, and fifth insulated gate type transistors are all equal.

4. The semiconductor integrated circuit according to claim 1, wherein said fifth insulated gate type transistor and said first and second capacitor means comprise a transistor wherein a floating gate electrode is formed through a first gate oxide film on a channel region between source and drain regions spaced from each other on a semiconductor substrate and wherein two gate electrodes electrically insulated from each other are provided through a second gate oxide film on said floating gate electrode.

5. The semiconductor integrated circuit according to claim 1, wherein said floating point is connected through switch means for reset to a reference potential.

6. The semiconductor integrated circuit according to claim 5, wherein when said switch means for reset is on, the currents of said first and second input signal current means are set to zero or a predetermined current value.

7. The semiconductor integrated circuit according to claim 3, wherein said channel widths W and said channel lengths L are equal among said transistors.

* * * * *

UNITED STATES PATENT AND TRADEMARK OFFICE
CERTIFICATE OF CORRECTION

PATENT NO. : 6,100,741
DATED : August 8, 2000
INVENTOR(S) : Katsuhisa Ogawa et al.

It is certified that error appears in the above-identified patent and that said Letters Patent is hereby corrected as shown below:

Column 2,
Line 32, "the" should be deleted (second occurrence);
Line 40, "32" should be deleted;
Line 62, "Va-V0·1n(Ix=19 Iy / $I0^2$)=V0·1n(Iz·Iout / $I0^2$)." should read -- Va=V0·1n (Ix·Iy / $I0^2$)=V0·1n(Iz·Iout / $I0^2$). --.

Column 3,
Line 2, "input-signal" should read -- input signal --.

Column 5,
Line 17, "WIL" should read -- W/L --;
Line 25, "the" should be deleted.

Column 6,
Line 5, "Cx, Cy, Vf (Cx·Vx +Cy·Vy) / (Cx+Cy) (Vx+Vy) / 2." should read -- Cx, Cy, Vf=(Cx·Vx+Cy·Vy) / (Cx+Cy)=(Vx+Vy) / 2. --;
Lines 60 and 62, "VMOS" should read -- υMOS --.

Column 7,
Line 6, "Φ=(Cox·Vox+Coy·Voy) / (Cox+Coy)" should read -- ΦF= (Cox·Vox+Coy·Voy) / (Cox+Coy) --;
Line 51, "the" should be deleted.

Column 8,
Line 37, "(Vx+Vy) / 2." should read -- =(Vx+Vy) / 2. --

Signed and Sealed this

Nineteenth Day of February, 2002

*Attest:*

JAMES E. ROGAN
*Director of the United States Patent and Trademark Office*

*Attesting Officer*